UNITED STATES PATENT OFFICE.

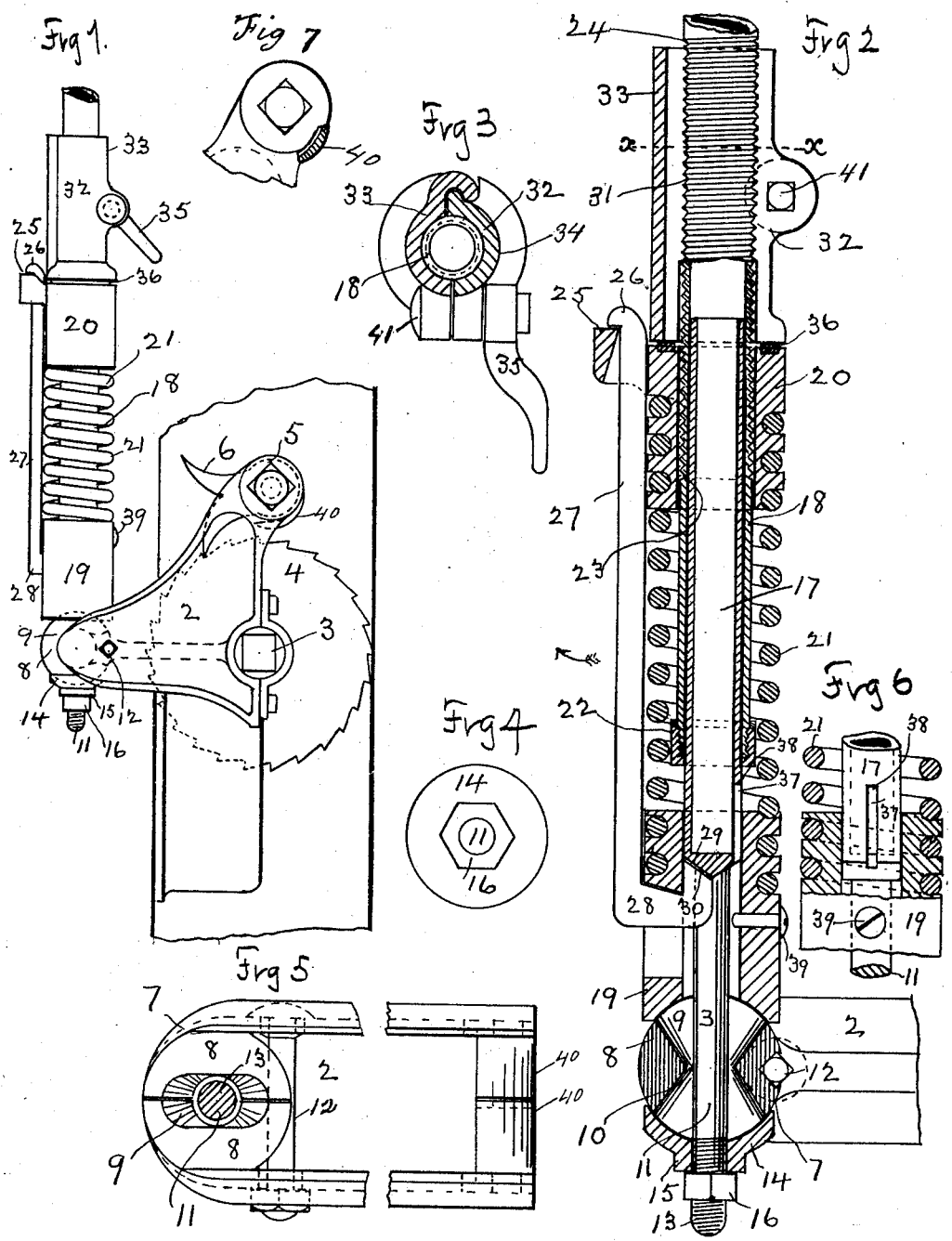

PAUL L. CROWE, OF JERSEY CITY, NEW JERSEY.

SPEED-REGULATOR RELEASING MECHANISM.

1,003,037.  Specification of Letters Patent. Patented Sept. 12, 1911.

Application filed October 13, 1909. Serial No. 522,425.

*To all whom it may concern:*

Be it known that I, PAUL L. CROWE, a citizen of the United States, and resident of Jersey City, in the county of Hudson and State of New Jersey, have invented certain new and useful Improvements in Speed-Regulator Releasing Mechanisms, of which the following is a specification.

My invention relates to power transmission, and the object is to provide such transmission with a speed regulator, releasing mechanism or safety device.

Referring to the drawings: Figure 1 is a side view of my speed regulator-safety device. Fig. 2 is an enlarged sectional elevation of the device, Fig. 3 is a cross sectional view on line X X, Fig. 2. Fig. 4 is a bottom view of the ball-bearing cap. Fig. 5 is a plan view showing the bearing-ball portion of the halves of the ratchet bracket and the extension of the spacing portions at the upper end thereof. Fig. 6 is a fragmentary elevation of the lower head partly in section to show the stem, which is shown in full lines. Fig. 7 is a fragmentary view of the upper portion of the divided bracket showing the spacing projection.

Numeral 2 represents a triangular divided bracket pivoted on the shaft 3 for further transmission. On this shaft is mounted the ratchet wheel 4, and on each side of this wheel are placed the halves of the said bracket 2, which halves are pivotally mounted on the shaft 3. The upper portion 5 of the bracket supports the double edged pawl 6, which is pivotally mounted between the halves of the bracket. As the bracket is operated the pawl will act upon the ratchet wheel on its downward travel in the direction it is to turn. The insides of the outer ends 7 of the bracket halves are each formed with a circular or ball shaped portion 8, which forms a complete ball when the halves are placed together, and vertically through the center of this ball portion 8, is formed an elongated slot 9, which is so shaped that its walls converge from the top and bottom toward the center 10 (see Fig. 2), leaving sufficient space at the central portion for the free passage of the stem 11. The halves of the bracket are held together at their ball ends 7, by a bolt 12, which passes through holes formed in the sides of bracket and partly through the ball. These holes are formed partly square and partly round, as adapted for carriage bolts. The stem 11 is made hollow and solid; the solid portion 13 is adapted to pass through the elongated slot 9, of the ball portion 8, of the bracket, and the extreme lower end of this solid portion 13 of the stem is threaded to receive the ball joint cap 14, formed with a nut shaped portion 15. The upper portion of this cap is so shaped and socketed that it will conform to the curve of the ball formed by the halves of the bracket (see Fig. 2.) To lock this cap against the ball, it is threaded and mounted upon the lower portion of the stem 13, as a nut 16 is then employed to lock the cap in position (see Fig. 2).

The hollow portion 17 of the stem 11 passes vertically within the vertical tube power transmission rod 18, and partly within the orifice of the lower spring head 19, the V-shaped portion 30 on one side of the solid portion 13, of stem having a large contact surface for the supporting end of the hooked portion which is hollowed out to receive the rounded portion of the stem 28 of the lever 27; the lower portion of said head is socketed to conform to the shape of the ball formed by and upon the bracket 2. In the periphery of the head 19 is located in the lower portion a recess for the reception of the hooked portion of said lever 27; the said head being connected to an upper head 20 by the coil spring 21 (see Fig. 2). The interior of these heads are bored smooth to conform to the size of the tubes within them. The exterior ends of the heads mounted to the spring are formed with grooves conforming to the pitch of the said spring. The upper portion of the tube 18 is adapted to be connected to an eccentric or any other form of transmission.

To the lower end of the tube 18 a collar 22 is mounted; this collar acts against the lower end of the upper head in raising the bracket and pawl for their operation to receive the blow of the upper stroke; the upper edge of the collar 22, may be protected by a cushion 36 of any suitable material serving as a buffer. The distance or space above the buffer-collar 22 of the tube is left plain or unthreaded to a point 23, but above this point the tube is threaded up to 24. This tube slides within the upper head 20, said head being provided with a slotted lug 25, adapted to receive and hold one end 26 of the disengaging lever 27. The hook 26 is so pivoted on the lug 25 that it will freely swing thereon and disengage the lower hooked end 28 of the lever from the lower head 19 when said hook is released. The face 29 of the hooked portion 28 is slightly beveled to give a larger wearing surface, and upon this bevel portion rests the bevel seat 30 of the stem. The hooked portion 28 of the disengaging lever acts as a weight to the same for the purpose of causing said hook to swing outward (see arrow, Fig. 2) when the hook 28 is released from the lower head.

Over threaded upper portion 31 of the tube 18 is placed the adjustable clamping nut 32 (see Figs. 2–3), said nut being formed in halves 33 and 34. The halves are so formed that they have respectively a tongued and grooved portion, which permits of the halves being readily united and separated when required. To hold them together when around the tube, I use a lever nut 35 and bolt 41 (see Figs. 2–3).

When the parts are assembled as shown in Fig. 2 the tube 18 when pressed down by the eccentric or other means will transmit its motion upon the upper head 20 through the clamping nut 32, striking the cushion 36 on said head. This action on the head 20 similarly acts upon the lower head 19 (through the spring) which operates the bracket 2, and consequently the ratchet wheel 4. When the tube 18 operates in a reverse direction, the buffer collar 22 strikes the lower portion of the upper head 20 and at the same time raises the bracket 2 sufficiently to catch the number of teeth in the ratchet wheel to which the adjustable nut has been adjusted upon the transmission tube 18. In the upper portion of the upper head a groove is formed into which a ring of leather is held for a cushion, which takes the blow of the adjustable clamp nut 32. The disengaging hook is so formed that its lower portion 28 supports in position the stem 11 upon which the ball bearing cap is mounted, thus forming a flexible ball and socket joint or bearing. The elongated slot was made as described for the purpose of allowing the stem to freely operate within the ball. Should the spring 21 be compressed beyond the normal strain, then the upper head 20 would be forced downward carrying with it the hooked lever 27, and causing it instantly to release itself, and swing outwardly from said lower head. When this release takes place the tube 18 will slide upon the stem 11. The stem 11 is also permitted to slide through the lower head and permits the bracket to remain stationary. To prevent the stem dropping lower than to permit the bracket to remain stationary in respect to the length of the stroke of rod 18, I provide said stem 11 with a slot 37 (see Fig. 6) and against the shouldered portion 38 acts the stop pin or screw 39 positioned in lower head.

The clamping nut has two-thirds of its length threaded and the lower end is left plain. The dove-tailed portion of the nut is so formed as to provide with the carriage bolt a flexible lock of said nut, and with the lever handled nut secured upon the bolt the adjustment of said clamping nut upon the tube is easily effected, thus forming a durable, flexible, releasing and speed regulating mechanism.

To regulate the speed it is necessary to loosen the lever nut 35 and raise or lower the clamping nut on the tube 18 by turning it as a swivel, then relock the clamping nut by the lever nut 35. This will lengthen or shorten the travel of the bracket on the ratchet wheel, turning same one or more teeth as the case may be. When the buffer is against the upper head 20 and the clamping nut is adjusted to the said upper head the pawl on the bracket will take full stroke or at least eight teeth on said ratchet wheel. The pawl is formed with double edge, the upper edge 6 causes an extra weight over the lower operating edge and allowing high speed to be maintained without slip and also to be reversed when necessary.

On the inside of the halves of the divided bracket are mounted inwardly projecting extensions, which meet each other when the bracket is mounted upon the worm shaft on each side of the wheel 4. These extensions are located above the wheel and below the pawl at 40 in such a manner that the pawl is allowed to operate the wheel above the extensions freely, and when the pawl is disengaged from the wheel it is thrown back and supported by the said extensions, which spaces the distance between the halves of the bracket and permits of clamping the said halves of the bracket with carriage bolts 41, said bolts having a square portion inside of the round head to allow of a quick attachment and facilitates the mounting of said bracket. The square hole is formed in each half of the bracket, thus allowing the bolt to be reversed as shown at 5 and 12 (see Fig. 1), and the nut to be applied and taken off with only one wrench.

What I claim is:

1. A power releaser comprising a stem, said stem being solid at one end and hollow at the other end, a bracket arm to which said stem is attached, said bracket provided with opening through which said stem passes, said opening converging toward the central portion, means for attaching said stem to said bracket, a tube sliding on said stem, an upper head to which said tube is connected, a lower head encircling said stem and oscillating on said bracket, said lower head having an opening, a coiled spring connecting the said heads, a locking lever, pivoted on said upper head, said lever adapted to pass through the opening in said lower head, and engage with the seat portion of said stem, means for pivotally supporting said bracket.

2. A power releaser comprising a stem, said stem having solid and hollow portions a bracket arm to which said stem is attached, said bracket provided with an opening through which said stem passes said opening converging toward the central portion means for attaching said stem to said bracket, a tube sliding on said stem, an upper head to which said tube is connected, a lower head encircling said stem and oscillating, on said bracket, said head having an opening, a coiled spring connecting the said heads, a locking lever pivoted on said upper head, said lever adapted to pass through the opening in said lower head, and engage with the seat portion of said stem means for pivotally supporting said bracket, a power transmission rod or tube passing through the said upper head and encircling the solid portion of said stem said tube being partially externally threaded, a collar mounted on the lower end of said tube, and means for transmitting the motion of said tube to the said upper head comprising an adjustable nut, said halves of said nut being loosely hinged together, and means for holding said nut halves together on said tube for operating the releaser.

Signed at Jersey City, in the county of Hudson and State of New Jersey this 9th day of October A. D. 1909.

PAUL L. CROWE.

Witnesses:
M. F. CARROLL,
R. J. McCABE.

---

Copies of this patent may be obtained for five cents each, by addressing the "Commissioner of Patents, Washington, D. C."